US012782225B2

(12) United States Patent
Wetzig et al.

(10) Patent No.: US 12,782,225 B2
(45) Date of Patent: Nov. 3, 2026

(54) VACUUM LEAK DETECTION USING MULTIPLE VACUUM CONNECTIONS AND A COMMON PUMP VOLUME

(71) Applicant: INFICON GmbH, Cologne (DE)

(72) Inventors: Daniel Wetzig, Cologne (DE); Yessica Brachthäuser, Cologne (DE); Sebastian Weiss, Cologne (DE)

(73) Assignee: INFICON GmbH, Cologne (DE)

( * ) Notice: Subject to any disclaimer, the term of this patent is extended or adjusted under 35 U.S.C. 154(b) by 288 days.

(21) Appl. No.: 18/693,119

(22) PCT Filed: Sep. 12, 2022

(86) PCT No.: PCT/EP2022/075305
§ 371 (c)(1),
(2) Date: Mar. 18, 2024

(87) PCT Pub. No.: WO2023/057173
PCT Pub. Date: Apr. 13, 2023

(65) Prior Publication Data

US 2025/0130133 A1 Apr. 24, 2025

(30) Foreign Application Priority Data

Oct. 4, 2021 (DE) ......................... 102021125707.7

(51) Int. Cl.
*G01M 3/02* (2006.01)
*G01M 3/22* (2006.01)
*G01M 3/34* (2006.01)

(52) U.S. Cl.
CPC .............. *G01M 3/229* (2013.01); *G01M 3/34* (2013.01)

(58) Field of Classification Search
CPC ............. G01M 3/02; G01M 3/22; G01M 3/28
See application file for complete search history.

(56) References Cited

U.S. PATENT DOCUMENTS

| | | | | |
|---|---|---|---|---|
| 5,767,391 | A * | 6/1998 | Wong .................... | G01M 3/202 73/40 |
| 2008/0276692 | A1 * | 11/2008 | Wetzig .................. | G01M 3/205 73/40.7 |

(Continued)

FOREIGN PATENT DOCUMENTS

| | | | |
|---|---|---|---|
| CN | 101126673 | A | 2/2008 |
| CN | 112326157 | A | 2/2021 |

(Continued)

*Primary Examiner* — Eric S. McCall
(74) *Attorney, Agent, or Firm* — Kirton McConkie; Whitney Blair

(57) ABSTRACT

The invention relates to a device for vacuum leak detection, comprising a vacuum pump (18), a test chamber (12) which is designed to accommodate the test specimen and can be evacuated by means of the vacuum pump (18), and a gas detector (16) which detects the gas evacuated from the test chamber (12) by means of the vacuum pump (18), wherein the test chamber (12) has a plurality of vacuum connections (26) provided with the vacuum pump (18) in order to evacuate the test chamber (12), characterized in that a common pump volume (28) which is connected to the vacuum connections (26) is fluidically provided between the vacuum connections (26) and the vacuum pump (18) and is evacuated by means of the vacuum pump (18).

20 Claims, 1 Drawing Sheet

(56) References Cited

U.S. PATENT DOCUMENTS

| | | | | |
|---|---|---|---|---|
| 2012/0261569 | A1 * | 10/2012 | Grosse Bley | G01M 3/229<br>73/40.7 |
| 2014/0216139 | A1 | 8/2014 | Yang | |
| 2019/0120715 | A1 * | 4/2019 | Bruhns | G01M 3/205 |
| 2024/0361201 | A1 * | 10/2024 | Wetzig | G01M 3/205 |
| 2025/0020534 | A1 * | 1/2025 | Strietzel | G01M 3/205 |
| 2025/0058284 | A1 * | 2/2025 | Wetzig | G01M 3/202 |

FOREIGN PATENT DOCUMENTS

| | | | |
|---|---|---|---|
| DE | 19846798 | A1 | 4/2000 |
| DE | 202019005500 | U1 | 10/2020 |
| JP | 2001257164 | A | 9/2001 |
| JP | 2018080965 | A | 5/2018 |

* cited by examiner

VACUUM LEAK DETECTION USING MULTIPLE VACUUM CONNECTIONS AND A COMMON PUMP VOLUME

CROSS-REFERENCE TO RELATED APPLICATIONS

This application is a National Stage of International Application No. PCT/EP2022/075305, filed Sep. 12, 2022, and entitled LEAK DETECTION IN A VISCOUS FLOW, which claims priority to German Patent Application No. DE 10 2021 125 707.7, filed Oct. 4, 2021, which are each incorporated herein by reference in their entirety.

FIELD

The invention relates to a method and a device for leak detection on a test specimen containing a test gas.

BACKGROUND

It is known to test specimens, such as food packages, heat exchangers or other hollow bodies that contain a test gas, for tightness by placing the test specimen in a test chamber and evacuating the test chamber volume by means of a vacuum pump. As soon as the pressure inside the test chamber is lower in the region outside the test specimen than the pressure inside the test specimen, test gas escapes through a possible leak in the test specimen and is evacuated by the vacuum pump. The gas flow evacuated by the vacuum pump is analyzed by a gas detector which detects test gas.

In the classical helium leak detection, the test specimen is filled with helium, wherein the test specimen is at atmospheric pressure or a pressure higher than atmospheric pressure. Typically, the test chamber is first pre-evacuated by a backing pump and is evacuated, during leak measurement, by a turbomolecular pump to a pressure of at most a few millibar. Test gas escaping from a leak in the test specimen results in a test gas concentration of the gas pumped out of the test chamber, which is detected by the detector. The test gas concentration or the test gas partial pressure serves as a measure of the leak rate in the test specimen. At a working pressure inside the test chamber of well below 1 mbar, the diffusion speed of the gases is sufficiently high, so that the test gas escaping from the test specimen reaches the sensor system of the gas detector without any significant time delay.

SUMMARY

The invention is based on the object of providing a more cost-effective vacuum leak detection system and a more cost-effective method for vacuum leak detection, which enables fast and homogeneous gas transport and thus fast and reproducible test gas detection.

According to the invention, a test chamber provided with several vacuum connections is connected to a vacuum pump, wherein a gas detector is used to detect test gas in the evacuated gas flow. In the present case, a vacuum connection is understood to be an opening in a wall, a bottom and/or a lid of the test chamber through which gas can pass from the interior of the test chamber into a volume connected to the vacuum connection.

At least a plurality of the vacuum connections and preferably all vacuum connections are connected to a common pump volume into which the vacuum connections open. The pump volume is connected to the vacuum pump via a pump line. The gas detector can be connected to the pump line. The vacuum connections are formed in at least one wall, bottom and/or lid of the test chamber that bounds the test chamber volume and are distributed as evenly as possible. The vacuum connections are designed such that, during operation, a lower vacuum pressure is formed in the pump volume than in the test chamber when the test chamber is evacuated with the vacuum pump. The common pump volume causes the flow velocity of the pumped gas to be higher than within the test chamber. This means that test gas escaping from a test specimen contained in the test chamber through a leak in the test specimen moves more slowly inside the test chamber than after having escaped from the test chamber through one of the vacuum connections. As soon as the test gas has escaped from the test chamber through a vacuum connection, the tracer gas is accelerated and supplied to the detector at an increased speed. Due to the multiple vacuum connections, the distance between a leak in the test specimen and the nearest vacuum connection is smaller than in the conventional case with only one vacuum connection. This means that the test gas has to travel a shorter distance inside the test chamber until it escapes from the test chamber through a vacuum connection. This also reduces the time it takes for test gas to travel from the leak to the gas detector.

In addition, the time at which the leakage gas from a leak reaches the detector is less dependent on the position of the leak on a test specimen in the test chamber and thus also less dependent on the position of the test specimen itself in the chamber. The signal strength measured by the test system at a given time when a leak exists in the test specimen is less dependent on the position of the test specimen in the test chamber.

Unlike conventional classical vacuum leak detection methods, the vacuum leak detection method according to the invention does not require a high vacuum pump or turbomolecular vacuum pump, but can instead be operated with technically simpler, less expensive vacuum pumps, such as a diaphragm pump, scroll pump or rotary vane pump. As a result, vacuum leak detection according to the invention is technically simplified and more cost-effective.

The vacuum connections can be arranged evenly, for example homogeneously, distributed across at least one wall, bottom and/or lid defining the inner volume of the test chamber. Preferably, a plurality of walls, the bottom and/or the lid are each provided with several vacuum connections. The vacuum connections can be arranged in a grid pattern, for example. The test chamber volume can be formed within one or more of the test chamber walls, the test chamber bottom and/or the test chamber lid, for example by a double bottom or a double wall forming the pump volume.

A plurality of the vacuum connections can be connected to the pump volume with lines of substantially the same length. Substantially the same length means that the differences in length of the vacuum lines are less than 10% of the total length of one of the vacuum lines.

The invention allows the use of a comparatively technically simple and comparatively inexpensive vacuum pumping system to enable fast vacuum leak detection by a fast and uniform gas transport of the pumped gas. This is achieved by the pump volume connected to the vacuum connections, where the difference between the pressure at any location inside the test chamber and the pressure at any location in the pump volume is greater than the difference between the pressures at two different locations inside the test chamber. Thereby, the gas pressure gradient extending over the distance from one location inside the test chamber to a location inside the test volume is greater and preferably significantly greater than the pressure gradient between optional point inside the test chamber.

According to the invention, the pressure distribution in the test chamber is to be as homogenous as possible, so that the pressures at different locations in the test chamber differ from each other by at most 1% in the region outside the test specimen, while the gas pressure at any location inside the pump volume is significantly lower than the pressure at any location inside the test chamber. Preferably, the pressure at a location inside the pump volume is at least 10% lower that at a location inside the test chamber. The pressure inside the test chamber is preferably less than 80, more preferably less than 40 and particularly preferred less than 20 mbar, while the pressure inside the pump volume is preferably less than 72, more preferably less than 36 and particularly preferred less than 18 mbar.

BRIEF DESCRIPTION OF THE DRAWINGS

Embodiments of the invention will be explained hereunder with reference to the Figures. In the Figures.

DETAILED DESCRIPTION

Figure 1:
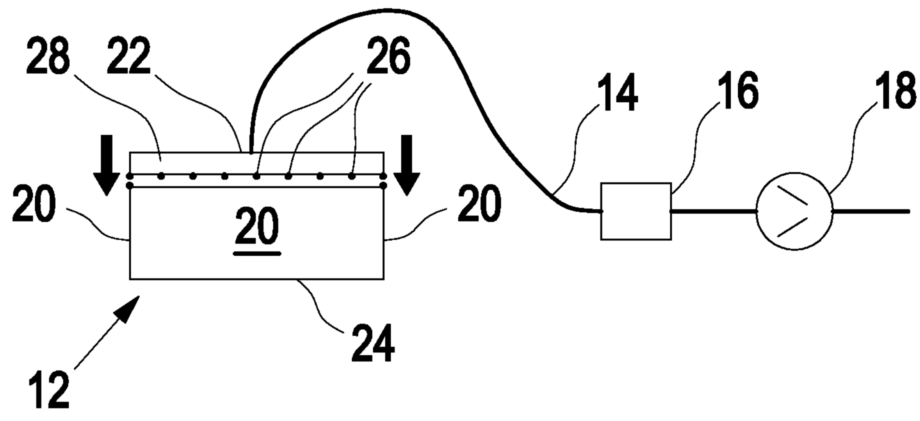
FIG. 1 is a schematic illustration of a first embodiment.
Figure 2:
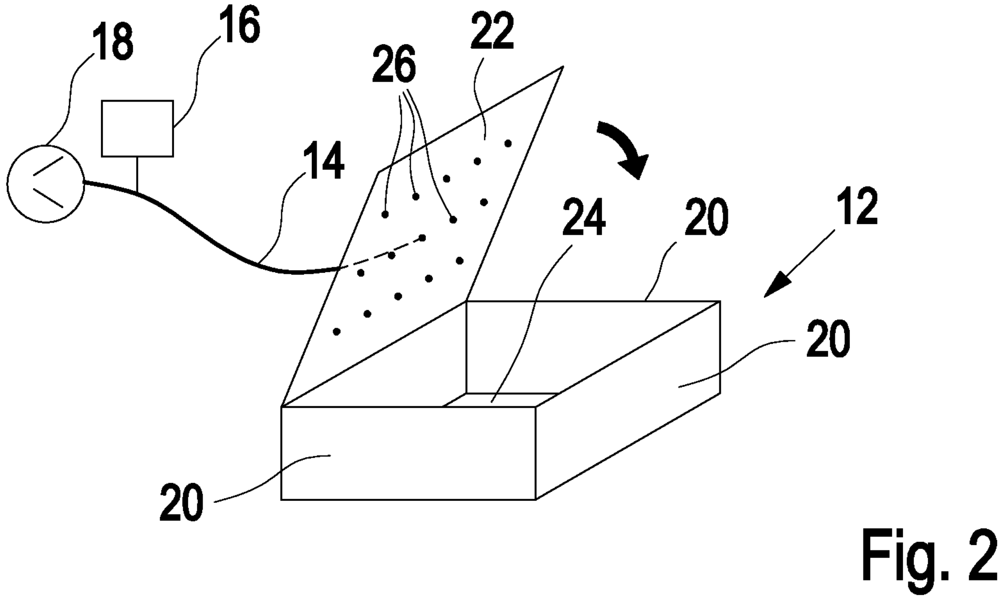
FIG. 2 is a schematic illustration of a second embodiment.

In all embodiments, a test chamber 12 is connected to a vacuum pump 18 via a pump line 14 to which a gas detector 16 is connected. The vacuum pump 18 may be a diaphragm pump, a scroll pump or a rotary vane pump. The test chamber is typically formed by a plurality of walls 20, a lid 22 and a bottom 24. FIGS. 1 and 2 each illustrate the test chamber 12 in an open state, while the lid 22 is closed in a gas-tight manner in the direction of the respective arrows illustrated.

In the embodiments illustrates in FIGS. 1 and 2, the lid 22 is respectively provided with a plurality of vacuum connections 26 which, arranged in a grid, are homogenously distributed over the entire inner side of the lid 22. The vacuum connections 26 are formed as holes illustrated as points in the Figures. In FIGS. 1 and 2, the vacuum connections 26 open into a common pump volume 28 which is formed as a cavity in the lid 22 and is connected to the vacuum pump 18 via the pump line 14.

Figure 3:
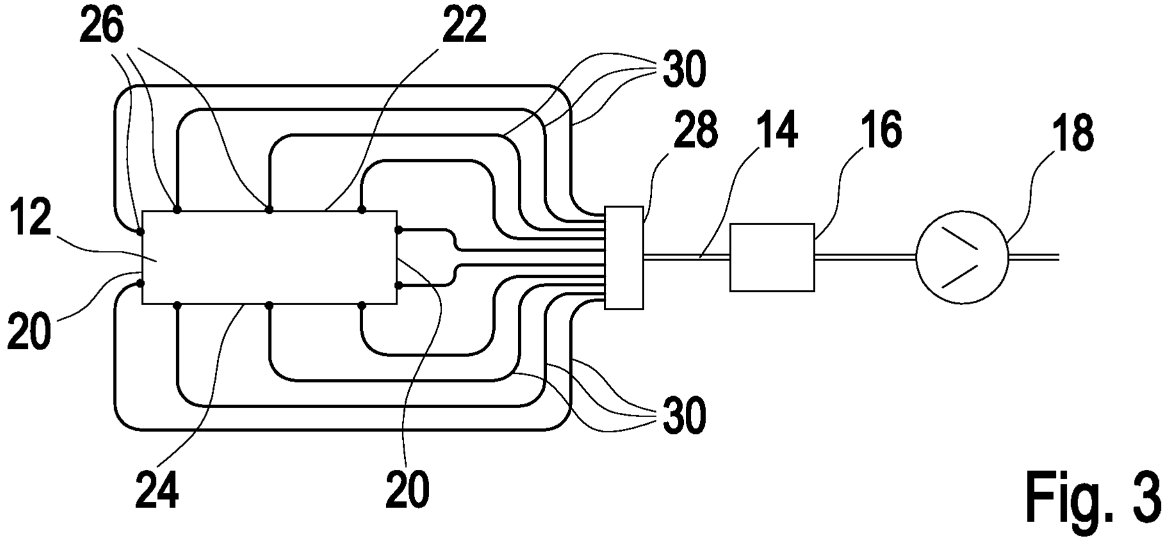
FIG. 3 is a schematic illustration of a third embodiment.

The embodiment illustrated in FIG. 3 differs from the embodiments illustrated in FIGS. 1 and 2 in that both the lid 22 and all of the walls 20 and the bottom of the test chamber 24 are each provided with a plurality of vacuum connections 26 which, in a simplified manner, are also illustrated as points. Each of the vacuum connections 26 is connected to the pump volume 28 via a separate vacuum line 30, the pump volume opening into the pump line 14. In the simplest case, the pump volume 28 may also be a section of the pump line 14.

After a test specimen not illustrated in the Figures has been placed in the test chamber 12 and the test chamber 12 has been closed, the vacuum pump 18 is used to reduce the pressure inside the test chamber 12 to 80, preferably less than 40 and particularly preferred less than 20 mbar. The pressure inside the test chamber is preferably less than 72 mbar, more preferred less than 36 mbar and particularly preferred less than 18 mbar.

If there is a leak in the test specimen, test gas will escape from inside the test specimen through the leak into the test chamber 12 and is drawn into the pump volume 28 through at least one of the vacuum connections 26. Due to the plurality of vacuum connections 26, the test gas only has to travel a comparatively short distance inside the test chamber before it reaches the pump chamber 28 via the respective closest vacuum connection 26. Compared to the conventional principle with only one vacuum connection, the plurality of vacuum connections 26 according to the invention reduces the relative distance of any location inside the test chamber to the closest vacuum connection 26. Thereby, the deviation of the time passing from the moment a leakage gas escapes to the moment it arrives at the detector, is smaller for different locations of a leak inside the test chamber that in the case of only one vacuum connection. Thus, the variance of this time is smaller for optional different positions of a leak inside the test chamber than in the case of only one vacuum connection.

As soon as the test gas has flown through the vacuum connection 26, the test gas is accelerated due to the lower pressure or the lower gas density in the pump volume 28. The diffusion rate or the flow rate of the pumped gas is higher in the pump volume 28 and the pump line 14 than in the test chamber 12.

Along a path between optional different points inside the test chamber 12, a gas pressure gradient forms in operation which is smaller than the gas pressure gradient forming along a path from a point inside the test chamber 12 to a point inside the pump volume 28.

The invention claimed is:

1. A device for leak detection comprising a vacuum pump, a test chamber configured to receive a test specimen and adapted to be evacuated by the vacuum pump, a gas detector detecting the gas evacuated from the test chamber by the vacuum pump, the test chamber being provided with a plurality of vacuum connections for evacuating the test chamber, the vacuum connections being connected to the vacuum pump and being arranged at different locations in at least one wall, bottom, or lid bounding an interior volume of the test chamber, wherein the plurality of vacuum connections are connected to a common pump volume shared by the plurality of vacuum connections, the common pump volume being provided fluidically between the plurality of vacuum connections and the vacuum pump, which common pump volume is evacuated by the vacuum pump, wherein the common pump volume is configured such that, during evacuation of the test chamber by the vacuum pump, gas pressure in the common pump volume is lower than gas pressure in the interior volume of the test chamber and a flow velocity of the gas in the common pump volume is higher than a flow velocity of the gas in the interior volume of the test chamber, and wherein the gas detector is configured to detect test gas escaping from a leak in the test specimen and evacuated from the interior volume through one of the plurality of vacuum connections and the common pump volume.

2. The device according to claim 1, wherein the vacuum connections open into the common pump volume.

3. The device according to claim 1, wherein the pump volume is formed in a wall, a bottom or a lid of the test chamber.

4. The device according to claim 1, wherein a plurality of the vacuum connections is connected to the common pump volume each by a separate vacuum line, and the vacuum lines are substantially equal in length.

5. The device according to claim 1, wherein the pump volume is connected to the vacuum pump via a common pump line.

6. The device according to claim 1, wherein the vacuum connections are formed as holes and are distributed across at least one housing wall of the test chamber delimiting the test chamber volume.

7. The device according to claim 1, wherein the vacuum connections are distributed in a grid-like manner across at least one wall, a lid and/or a bottom of the test chamber.

8. The device according to claim 1, wherein the vacuum connections are arranged in a homogenously distributed manner.

9. The device according to claim 1, wherein, during vacuum leak detection, pressures at different locations in the interior volume outside the test specimen differ from each other by at most 1%, and a gas pressure at a location inside the common pump volume is at least 10% lower than a gas pressure at a location inside the interior volume.

10. A method for vacuum leak detection with a vacuum leak detection device comprising a vacuum pump, a gas detector and a test chamber, the vacuum pump evacuating the test chamber and the gas detector detecting a test gas in the gas evacuated from the test chamber by the vacuum pump, the test chamber comprising a plurality of vacuum connections arranged at different locations in at least one wall, bottom, or lid bounding an interior volume of the test chamber and connected to a common pump volume shared by the plurality of vacuum connections, the common pump volume being formed fluidically between the plurality of vacuum connections and the vacuum pump, the method comprising the steps of:

placing a test specimen containing test gas in the test chamber, evacuating the common pump volume and the test chamber such that a gas pressure gradient extending from the test chamber into the common pump volume is greater than any gas pressure gradient extending transversely through the test chamber inside the test chamber, causing test gas escaping from a leak in the test specimen to be evacuated from the interior volume of the test chamber through one of the plurality of vacuum connections and into the common pump volume, wherein the flow velocity of the gas evacuated from the test chamber is higher inside the common pump volume than inside the test chamber, and detecting, with the gas detector, the test gas evacuated from the test chamber through the common pump volume.

11. The method according to claim 10, wherein the difference between the gas pressures at two different locations inside the test chamber is negligibly small during the vacuum leak detection.

12. The method according to claim 10, wherein the vacuum pressure generated at the inlet of the vacuum pump and/or inside the pump volume is lower than 72 mbar.

13. The method according to claim 10, wherein the vacuum pressure generated inside the test chamber is higher than in the pump volume and is in particular lower than 80 mbar.

14. A device for vacuum leak detection comprising:

a vacuum pump;

a test chamber defining an interior volume configured to receive a test specimen and adapted to be evacuated by the vacuum pump;

a gas detector configured to detect a test gas in gas evacuated from the interior volume by the vacuum pump;

a lid of the test chamber;

a plurality of vacuum connections formed as holes in the lid and arranged in a grid-like, homogeneously distributed manner over an inner side of the lid, each of the plurality of vacuum connections providing an opening through which gas passes from the interior volume; and a common pump volume formed as a cavity in the lid, the plurality of vacuum connections opening into the common pump volume, the common pump volume being provided fluidically between the plurality of vacuum connections and the vacuum pump and being connected to the vacuum pump via a pump line, such that gas evacuated from the interior volume through any of the plurality of vacuum connections enters the common pump volume before reaching the pump line;

wherein the common pump volume is configured so that, during evacuation of the interior volume by the vacuum pump, a gas pressure in the common pump volume is lower than a gas pressure in the interior volume, and a flow velocity of pumped gas is higher in the common pump volume than in the interior volume.

15. The device according to claim 14, wherein the gas detector is connected to the pump line.

16. The device according to claim 14, wherein the vacuum pump comprises a diaphragm pump, a scroll pump, or a rotary vane pump.

17. The device according to claim 14, wherein, during vacuum leak detection, the gas pressure in the common pump volume is at least 10% lower than the gas pressure in the interior volume.

18. The device according to claim 14, wherein, during vacuum leak detection, the gas pressure inside the interior volume is less than 80 mbar and the gas pressure inside the common pump volume is less than 72 mbar.

19. The device according to claim 14, wherein, during evacuation of the interior volume by the vacuum pump, a pressure difference between any location inside the interior volume and any location inside the common pump volume is greater than a pressure difference between two different locations inside the interior volume.

20. The device according to claim 19, wherein, during vacuum leak detection, pressures at different locations in the interior volume outside the test specimen differ from each other by at most 1%.

* * * * *